United States Patent
Byers (10) Patent No.: US 10,323,854 B2
(45) Date of Patent: Jun. 18, 2019

(54) DYNAMIC CONTROL OF COOLING DEVICE BASED ON THERMOGRAPHIC IMAGE ANALYTICS OF COOLING TARGETS

(71) Applicant: Cisco Technology, Inc., San Jose, CA (US)

(72) Inventor: Charles Calvin Byers, Wheaton, IL (US)

(73) Assignee: CISCO TECHNOLOGY, INC., San Jose, CA (US)

(*) Notice: Subject to any disclaimer, the term of this patent is extended or adjusted under 35 U.S.C. 154(b) by 64 days.

(21) Appl. No.: 15/493,945

(22) Filed: Apr. 21, 2017

(65) Prior Publication Data

US 2018/0306457 A1  Oct. 25, 2018

(51) Int. Cl.
*G05D 23/00* (2006.01)
*F24F 11/30* (2018.01)
*G01J 5/00* (2006.01)
*G05D 23/19* (2006.01)
*F24F 11/62* (2018.01)
(Continued)

(52) U.S. Cl.
CPC .............. *F24F 11/30* (2018.01); *F24F 11/62* (2018.01); *F24F 11/79* (2018.01); *G01J 5/0025* (2013.01); *G05D 23/1917* (2013.01); *F24F 11/65* (2018.01); *F24F 2110/10* (2018.01); *F24F 2120/10* (2018.01); *F24F 2120/12* (2018.01);
(Continued)

(58) Field of Classification Search
CPC .................................................. G05D 23/1917
USPC .......................................................... 700/278
See application file for complete search history.

(56) References Cited

U.S. PATENT DOCUMENTS 5,145,112 A * 9/1992 Ueda ................... B60H 1/00742
236/49.3
5,291,748 A * 3/1994 Ueda ................... B60H 1/00742
236/78 D
(Continued)

FOREIGN PATENT DOCUMENTS

CN 102192171 A 9/2011
CN 105020156 A 11/2015
(Continued)

OTHER PUBLICATIONS

Dyson, Fan Heater Slide, [online], [retrieved on Mar. 8, 2017]. Retrieved from the Internet: <URL: http://www.dyson.com/medialibrary/Group/Carousels/SlideBackground/FansHeaters/Fans/AM01%2002%2003/Large/AM01_Cooling_Tech_1000x560.ashx>, 1 page.
(Continued)

*Primary Examiner* — Suresh Suryawanshi
(74) *Attorney, Agent, or Firm* — Leon R. Turkevich (57) ABSTRACT

In one embodiment, a method comprises a controller receiving a thermographic image of an area to be cooled by one or more cooling devices; the controller identifying at least a first cooling target within the area to be cooled based on executing image analytics on the thermographic image, the first cooling target identified based on prioritizing hot zones on one or more identified objects in the thermographic image, and identifying among the prioritized hot zones the first cooling target as covering a first hot zone on a first identified object; and the controller generating and sending a cooling command to the one or more cooling devices for directed cooling of at least the first cooling target.

20 Claims, 6 Drawing Sheets

(51) Int. Cl.
*F24F 11/79* (2018.01)
*F24F 120/12* (2018.01)
*F24F 120/10* (2018.01)
*F24F 110/10* (2018.01)
*F24F 120/14* (2018.01)
*F24F 11/65* (2018.01)

(52) U.S. Cl.
CPC ... *F24F 2120/14* (2018.01); *G01J 2005/0081* (2013.01)

(56) References Cited

U.S. PATENT DOCUMENTS

| | | | | |
|---|---|---|---|---|
| 5,384,716 | A * | 1/1995 | Araki | F24F 11/0009 374/112 |
| 8,364,317 | B2 * | 1/2013 | Park | F24F 11/30 700/276 |
| 9,841,216 | B2 * | 12/2017 | Matsumoto | F25B 49/00 |
| 9,862,245 | B2 * | 1/2018 | Kim | B60H 1/00742 |
| 9,863,660 | B2 * | 1/2018 | Kusukame | H04N 5/33 |
| 9,915,438 | B2 * | 3/2018 | Cheatham, III | F24F 11/30 |
| 2014/0148706 | A1 * | 5/2014 | Van Treeck | A61B 5/015 600/474 |
| 2015/0075765 | A1 * | 3/2015 | Bakewell | F28F 27/00 165/287 |
| 2016/0071486 | A1 | 3/2016 | Byers et al. | |
| 2016/0082808 | A1 * | 3/2016 | Perkins | B60H 1/00871 165/11.2 |
| 2016/0116178 | A1 * | 4/2016 | Vega | F24F 11/52 700/276 |
| 2016/0175856 | A1 * | 6/2016 | Paschkewitz | B29C 64/112 427/562 |
| 2016/0258643 | A1 * | 9/2016 | Cheatham, III | F24F 11/006 |
| 2016/0363341 | A1 | 12/2016 | Arens et al. | |
| 2018/0100662 | A1 * | 4/2018 | Farahmand | F24F 11/62 |

FOREIGN PATENT DOCUMENTS

| | | | | |
|---|---|---|---|---|
| CN | 105370606 | A | | 3/2016 |
| JP | 55095054 | A * | 7/1980 | ............ F24F 11/30 |
| JP | 03102128 | A * | 4/1991 | |
| JP | 07243687 | A * | 9/1995 | |
| JP | 2008138902 | A * | 6/2008 | |
| JP | 2008157548 | A * | 7/2008 | ............ G06F 19/00 |
| JP | 2009120143 | A * | 6/2009 | |
| JP | 2016169942 | A * | 9/2016 | ............ F24F 11/30 |

OTHER PUBLICATIONS

Crist, "Are connected ceiling fans the ultimate smart-home splurge?", [online], Apr. 13, 2016, [retrieved on Mar. 8, 2017]. Retrieved from the Internet: <URL: https://www.cnet.com/news/connected-ceiling-fans-in-the-cnet-smart-home/>, pp. 1-4.

Dyson Fans, [online], [retrieved on Jan. 25, 2017]. Retrieved from the Internet: <URL: http://www.dyson.com/air-treatment/legacyfans.aspx>, pp. 1-4.

Lumens, "Circulaire III Indoor/Outdoor Ceiling Fan", [online], [retrieved on Mar. 8, 2017]. Retrieved from the Internet: <URL: http://www.lumens.com/circulaire-iii-indoor-outdoor-ceiling-fan-by-savoy-house-SVH523753.html?utm_source=google&utm_medium=PLA&utm_term=&scid=scplp9688167&sc_intid=SVH523753>, pp. 1-2.

Fridlander et al., "Smart Fan—A Human Tracking Fan System", ECE 4760: Final Projects, 2011, pp. 1-13.

Wikipedia, "Forward looking infrared", [online], Jan. 7, 2017, [retrieved on Apr. 7, 2017]. Retrieved from the Internet: <URL: https://en.wikipedia.org/w/index.php?title=Forward_looking_infrared&printable=yes>, pp. 1-5.

Wikipedia, "Thermography", [online], Feb. 25, 2017, [retrieved on Nov. 9, 2017]. Retrieved from the Internet: <URL: https://en.wikipedia.org/w/index.php?title=Thermography&oldid=767297058>, pp. 1-9.

* cited by examiner

DYNAMIC CONTROL OF COOLING DEVICE BASED ON THERMOGRAPHIC IMAGE ANALYTICS OF COOLING TARGETS

TECHNICAL FIELD

The present disclosure generally relates to dynamic control of a cooling device based on thermographic image analytics of cooling targets.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Heating, Ventilation and Air Conditioning (HVAC) are among the top energy-consuming services of the developed world. Often, rooms or whole buildings are environmentally controlled based upon the readings from a single sensor, for example a wall thermostat. Reliance on a single thermostat for HVAC control is far from ideal, as the comfort of individual occupants of a room is never optimized. Personal fans, ceiling fans, and zoned air ducts can improve the comfort of a building's occupants at specific locations, but such devices require manual intervention to adjust fan speed or direction.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises a controller receiving a thermographic image of an area to be cooled by one or more cooling devices; the controller identifying at least a first cooling target within the area to be cooled based on executing image analytics on the thermographic image, the first cooling target identified based on prioritizing hot zones on one or more identified objects in the thermographic image, and identifying among the prioritized hot zones the first cooling target as covering a first hot zone on a first identified object; and the controller generating and sending a cooling command to the one or more cooling devices for directed cooling of at least the first cooling target.

In another embodiment, an apparatus comprises a device interface circuit and a processor circuit. The device interface circuit is configured for receiving a thermographic image of an area to be cooled by one or more cooling devices. The processor circuit is configured for identifying at least a first cooling target within the area to be cooled based on the processor circuit executing image analytics on the thermographic image, the first cooling target identified based on prioritizing hot zones on one or more identified objects in the thermographic image, and identifying among the prioritized hot zones the first cooling target as covering a first hot zone on a first identified object. The processor circuit further is configured for generating a cooling command that is output by the device interface circuit, the cooling command including instructions for the one or more cooling devices to implement directed cooling of at least the first cooling target.

In another embodiment, one or more non-transitory tangible media are encoded with logic for execution by a machine and when executed by the machine operable for: receiving, by the machine implemented as a controller, a thermographic image of an area to be cooled by one or more cooling devices; identifying at least a first cooling target within the area to be cooled based on executing image analytics on the thermographic image, the first cooling target identified based on prioritizing hot zones on one or more identified objects in the thermographic image, and identifying among the prioritized hot zones the first cooling target as covering a first hot zone on a first identified object; and generating and sending a cooling command to the one or more cooling devices for directed cooling of at least the first cooling target.

DETAILED DESCRIPTION

Particular embodiments enable precise identification of cooling targets for one or more cooling devices based on thermographic image analytics on a thermographic image of an area to be cooled: the thermographic image analytics enables a prioritization of hot zones on one or more identified objects in the thermographic image, where the prioritization of hot zones is based on the identities of the identified objects, such that certain objects that do not require cooling can be excluded from the prioritization of hot zones.

Hence, the use of thermographic image analytics enables precise identification of cooling targets based on prioritizing hot zones on objects identified as requiring cooling. The precise identification of cooling targets enables use of low-power devices that can provide directed cooling of one or more cooling targets, for example one or more low-power (10-15 Watt) cooling fans that can be powered via a Power over Ethernet (PoE) connection that can provide up to 60 Watts. Hence, a cooling command to a low-power cooling device (e.g., a bladeless cooling fan) can specify parameters for the lower-power fan to generate an airflow cone directed at the cooling target, including for example direction (e.g., azimuth and tilt), fan speed, and airflow cone angle.

Hence, the example embodiments can provide precise directed cooling of at least a first cooling target (e.g. the head of an overheated person), while excluding from the airflow cone generated by the low-power fan any cold zone of an object to be cooled (e.g., cold feet), or excluding from the airflow cone any object that does not require cooling (e.g., a pet dog or a pot of boiling water).

Figure 1:
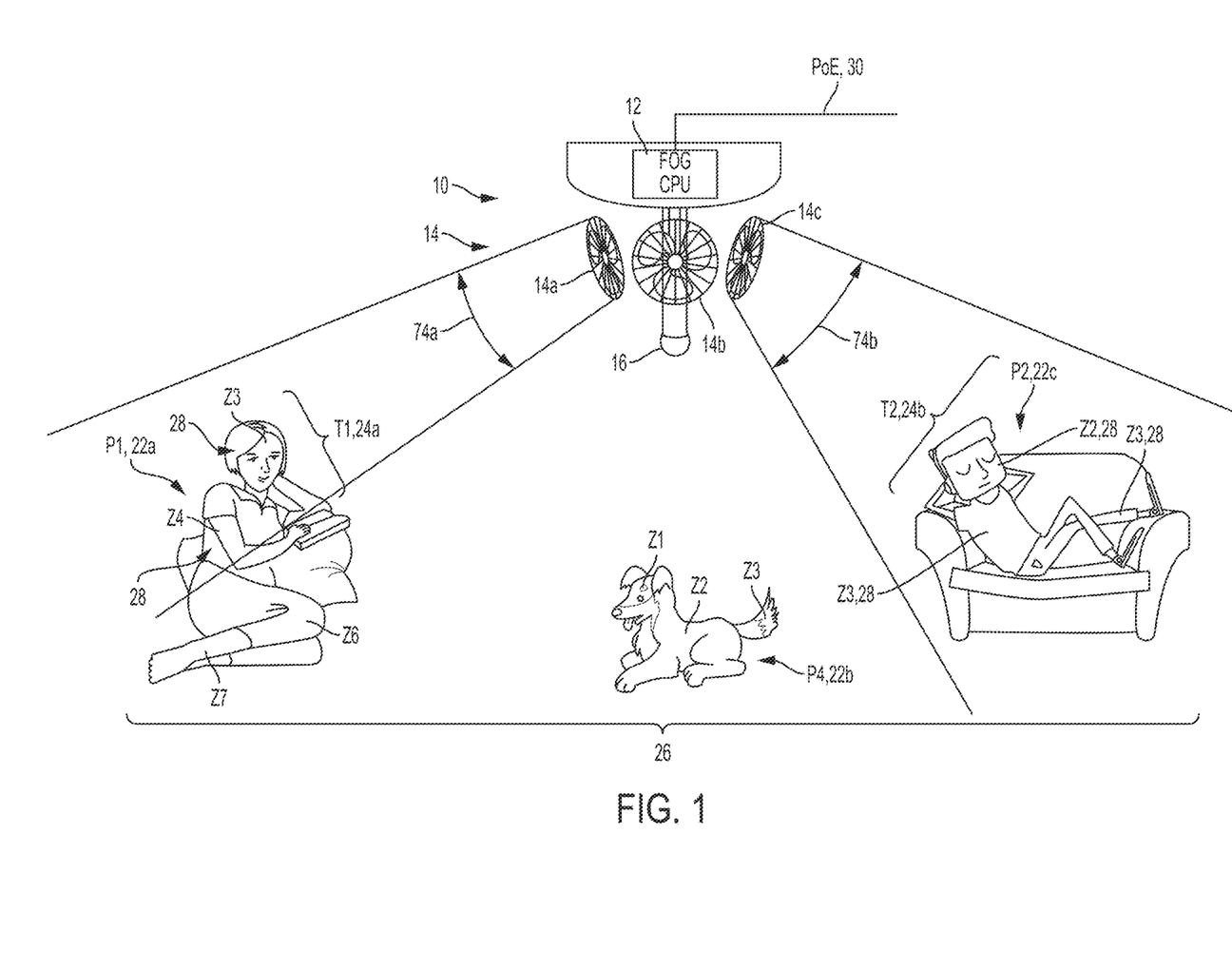
FIG. 1 illustrates an example system having an apparatus for identifying cooling targets based on executing image analytics on a thermographic image of an area to be cooled by one or more cooling devices, including prioritizing hot zones for directed cooling, according to an example embodiment.

FIG. 1 is a diagram illustrating an example low-power cooling system 10 having a controller device 12, one or more controllable cooling devices 14, and a thermographic image sensor array 16, according to an example embodiment. The apparatus 12 is a physical machine (i.e., a hardware device) configured for implementing network-based communications with other physical machines 14, 16. The term "configured for" or "configured to" as used herein with respect to a specified operation refers to a device and/or machine that is physically constructed and arranged to perform the specified operation. The low-power cooling system 10 could also be considered an example deployment of the Internet of Things, wherein sensors such as the thermographic image sensor 16, control systems such as those implemented on the controller device 12, and actuators such as cooling devices 14 can interoperate in a closed-loop system for directed cooling of cooling targets.

Figure 2:
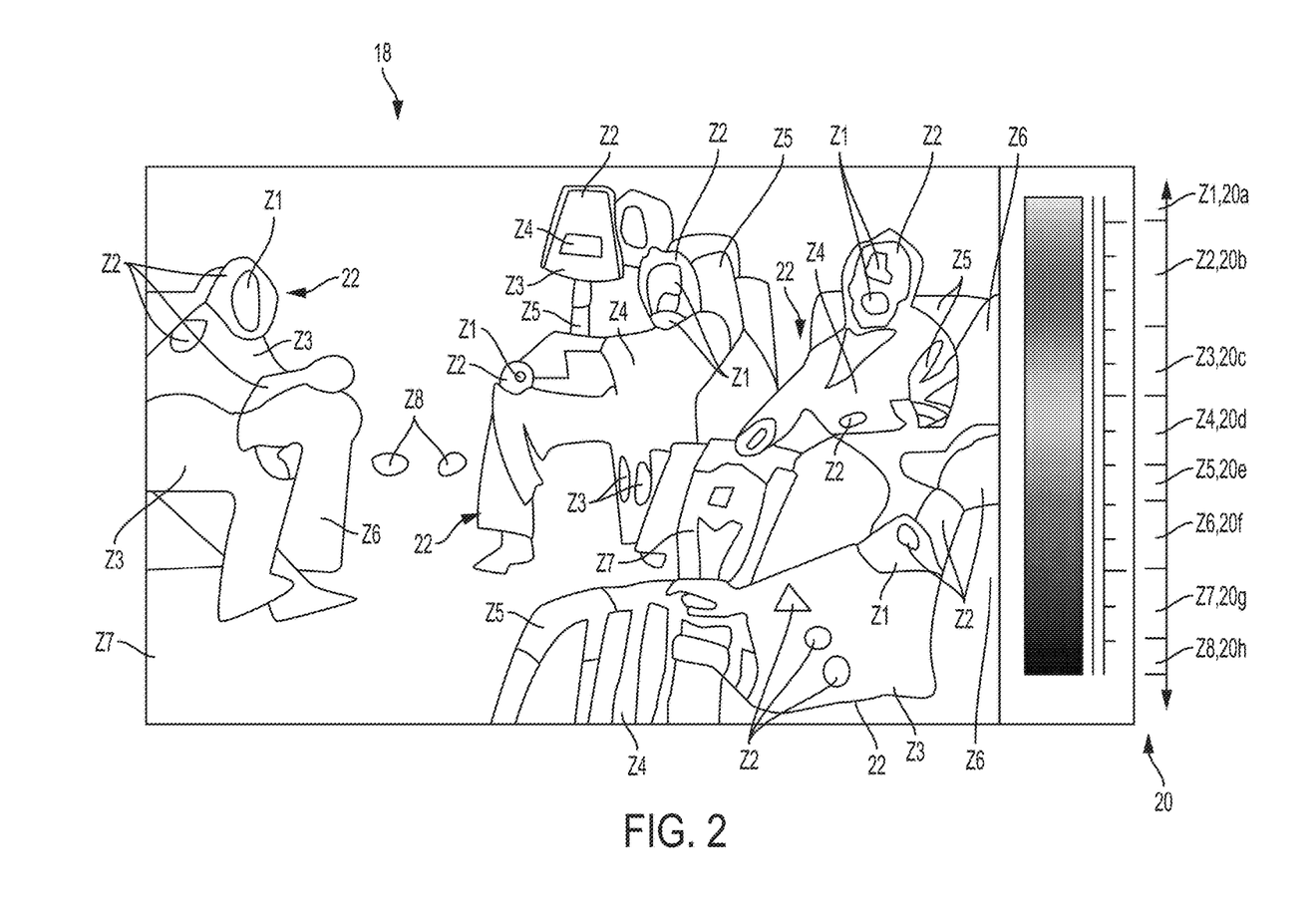
FIG. 2 illustrates example image analytics executed on a thermographic image for identification of cooling targets, according to an example embodiment.

The thermographic image sensor array 16 comprises an array of thermographic sensors (e.g., an array of infrared sensors) and the thermographic image sensor array 16 is configured for generating a thermographic image (18 of FIG. 2). An example thermographic image sensor array 16 can be a Forward Looking Infrared (FLIR) imaging camera, commercially available from Sierra Pacific Innovations Corporation, Las Vegas, Nev. Another example thermographic image sensor array 16 can use mechanical, optical or electrical scanning of one or more radiant heat sensors, where thermographic images can be constructed by arranging multiple readings from multiple scanning positions into an image array. The thermographic image 18 generated by the thermographic image sensor array 16 can be implemented, for example as a color-based image having different colors representing respective temperatures that can be used to identify different thermographic zones 20, described below.

Each cooling device 14 can be implemented as a bladeless cooling device that can be remotely controlled (e.g., by azimuth, tilt, fan speed/airflow speed, airflow cone angle, oscillation share) to generate airflow toward one or more cooling targets, described in further detail below. An example cooling device 14 is the Dyson Air Multiplier™ fan, commercially available from Dyson, Inc., Chicago, Ill. The cooling device 14 also can be implemented based on deployment of one or more compressed air nozzles, and/or one or more actively-controllable outlet vents configured for receiving airflow from a central ventilation duct in a building, etc.

As described in further detail below and as illustrated in the black-and-white representation of the thermographic image 18 in FIG. 2, the controller device 12 can execute image analytics for identification of the thermographic zones 20 and identification of one or more objects 22 in the thermographic image 18. In particular, each thermographic zone 20 identified in a thermographic image 18 has a corresponding position, shape, and an identified temperature (or temperature range, as appropriate). Hence, the image analytics executed by the controller device 12 can identify the positions and shapes of thermographic zones 20 based on the corresponding color (representing temperature) in the thermographic image 18, and the image analytics executed by the controller device 12 can identify the one or more objects 22 in the thermographic image 18 of FIG. 2 based on executing pattern matching and/or pattern recognition operations on the thermographic image 18.

The image analytics executed by the controller device 12 can identify the following example thermographic zones 20 based on the following example temperature ranges: the color "white" in the thermographic image 18 can correspond to a first thermographic zone "Z1" 20a for a detected temperature in a range above ninety degrees Fahrenheit (e.g., Z1>90° F.); the color "red" in the thermographic image 18 can correspond to a second thermographic zone "Z2" 20b for a detected temperature in the range of eighty-four and ninety degrees Fahrenheit (e.g., 84°<Z2≤90° F.); 8016018the color "orange" in the thermographic image 18 can correspond to a third thermographic zone "Z3" 20c for a detected temperature in the range of eighty and eighty-four degrees Fahrenheit (e.g., 80°<Z3≤84° F.); the color "yellow" in the thermographic image 18 can correspond to a fourth thermographic zone "Z4" 20d for a detected temperature in the range of seventy-six and eighty degrees Fahrenheit (e.g., 76°<Z4≤80° F.); the color "green" in the thermographic image 18 can correspond to a fifth thermographic zone "Z5" 20e for a detected temperature in the range of seventy-four and seventy-six degrees Fahrenheit (e.g., 74°<Z5≤76° F.); the color "light blue" in the thermographic image 18 can correspond to a sixth thermographic zone "Z6" 20f for a detected temperature in the range of seventy and seventy-four degrees Fahrenheit (e.g., 70°<Z6≤74° F.); the color "dark blue" in the thermographic image 18 can correspond to a seventh thermographic zone "Z7" 20g for a detected temperature in the range of sixty-six and seventy degrees Fahrenheit (e.g., 66°<Z7≤70° F.); and the color "black" in the thermographic image 18 can correspond to an eighth thermographic zone "Z8" 20h for a detected temperature in the range at or below sixty-six degrees Fahrenheit (e.g., Z8<66° F.). As apparent from the foregoing, actual implementation in color can result in "color blending" at zone transitions, for example the thermographic image 18 may represent the temperature eighty-nine degrees Fahrenheit (89° F.) as a "light-red" color, and the temperature eighty-three degrees Fahrenheit (83° F.) as a "red-orange" color, etc. The disclosed thermographic zones 20 are by way of illustration only, and different values for temperature ranges of the thermographic zones 20 can be used, as appropriate.

As described in further detail below, the controller device 12 can identify one or more cooling targets (e.g., 24a, 24b of FIGS. 1 and 5) within an area 26 to be cooled based on executing image analytics on the thermographic image 18. The cooling targets 24a and/or 24b can be identified based on the image analytics identifying objects 22 (e.g., 22a, 22b, 22c of FIG. 1) within the cooling area 26. For example, the image analytics executed by the controller device 12 can identify a first cooling target "T1" 24a of a head and torso of a person "P1" 22a, and a second cooling target "T2" 24b of the entire body of a person "P2" 22c. The cooling targets 24a and/or 24b can be identified based on the image analytics identifying the objects 22 within the cooling area 26, and prioritizing the thermographic zones 20 as "hot zones" 28 on one or more of the identified objects 22 in the thermographic image 18. The image analytics executed by the controller device 12 can identify among the prioritized hot zones 28 the first cooling target "T1" 24a as containing or covering at least a first hot zone (e.g., Z3, Z4) 28 on the first identified object "P1" 22a; the image analytics executed by the controller device 12 also can identify among the prioritized hot zones 28 a second cooling target "T2" 24b as containing at least a second hot zone (e.g., Z2, Z3) 28 on the second identified object "P2" 22c, for example the hot zone "Z2" 28 on the face of the second identified object "P2" 22c, the hot zone "Z3" 28 on the torso of the second identified object "P2" 22c, and another hot zone "Z3" 28 on the legs of the second identified object "P2" 22c. The image analytics executed by the controller device 12 also can selectively exclude an identified object (e.g., a household pet) "P4" 22b and/or any inanimate object it recognizes in the cooling area 26 that does not require cooling. The prioritization of hot zones 28 ensures that the controller device 12 can avoid cooling of areas that are sufficiently cool, for example the cooler feet of the person "P1" 22a represented by the thermographic zone "Z7"; hence, the prioritization of hot zones 28 can ensure the comfort of the occupants within the cooling area 26 with minimal power consumption.

Hence, the controller device 12 can generate and send one or more cooling commands (e.g., 64 of FIG. 5) to the one or more cooling devices 14 for directed cooling of at least the first cooling target 24a and/or the second cooling target 24b using one or more low-power cooling devices 14 capable of operating using a Power over Ethernet (PoE) connection 30, while avoiding any cold zone (e.g., "Z7" 20g) of an identified eligible object (e.g., "P1" 22a) or selectively excluding an identified object "P4" 22b that does not require cooling.

Figure 3:
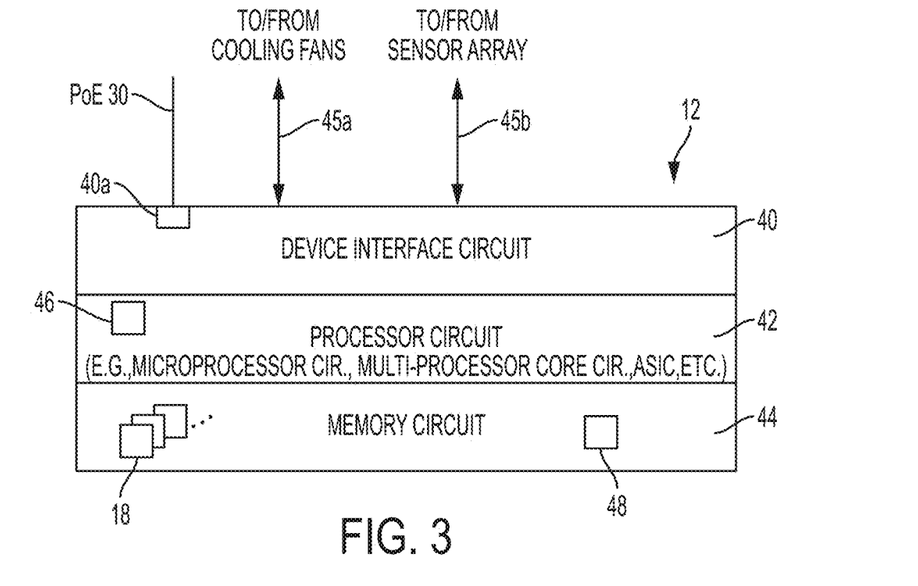
FIG. 3 illustrates an example implementation of the controller of FIG. 1, according to an example embodiment.

FIG. 3 illustrates an example implementation of the controller device 12 of FIG. 1, according to an example embodiment. The apparatus 12 can include a device interface circuit 40, a processor circuit 42, and a memory circuit 44. The device interface circuit 40 can include one or more distinct physical layer transceivers for communication with any one of the cooling fans 14 and/or the thermographic image sensor array 16 via any type of data link (e.g., a wired or wireless link, an optical link, etc.) 45a, 45b, for example an IEEE based Ethernet and/or Bluetooth transceiver for communications with the devices 14 and/or 16 of FIG. 1 via a Power over Ethernet connection 30 and/or another device-specific data link (e.g., wired or wireless data link). In the example embodiment, the device interface circuit 40 includes an IEEE based Ethernet transceiver and Power over Ethernet connector 40a configured for receiving electrical power via the Power over Ethernet connection 30 as a Powered Device (PD); alternatively, a USB 3.0 connecter can be implemented for reception of electrical power via a USB 3.0 connection. The processor circuit 42 can be configured for executing any of the operations described herein; for example, the processor circuit 42 can be configured for executing an executable image analytics resource 46 (e.g., an executable software resource) that can generate image analytics results 48 in response to one or more received thermographic images 18. The memory circuit 44 can be configured for storing any data or data packets as described herein, for example the one or more thermographic images 18 acquired from the thermographic image sensor array 16 via the PoE connection 30 and/or the data link 45b, and/or the image analytics results 48 as described below, etc.

Any of the disclosed circuits of the controller device (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), a graphics processing unit (GPU), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message", "outputting a packet", and/or "outputting an instruction" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" and/or "outputting an instruction" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" and/or "outputting an instruction" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
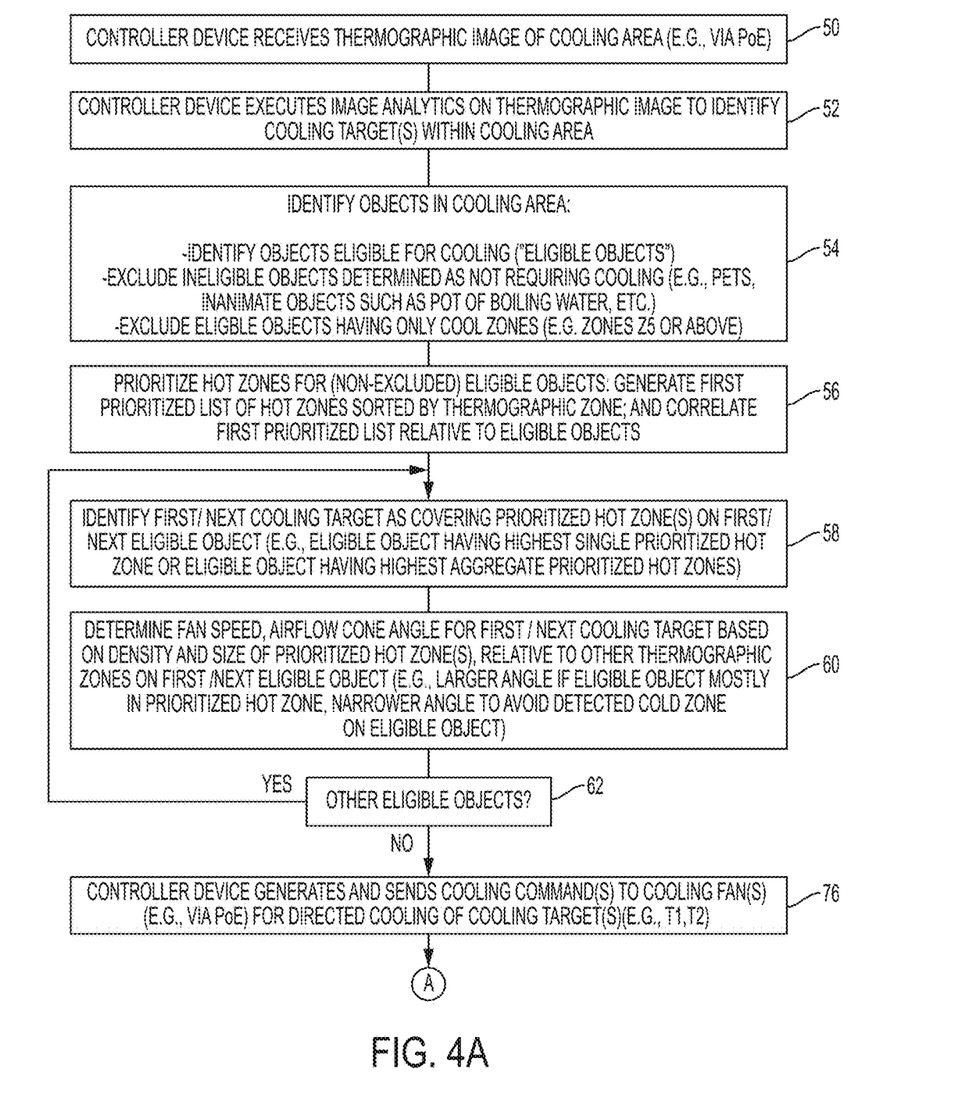
FIGS. 4A and 4B illustrate an example method for identifying cooling targets based on executing image analytics on a thermographic image of an area to be cooled by one or more cooling devices, including prioritizing hot zones for directed cooling, according to an example embodiment.
Figure 4B:
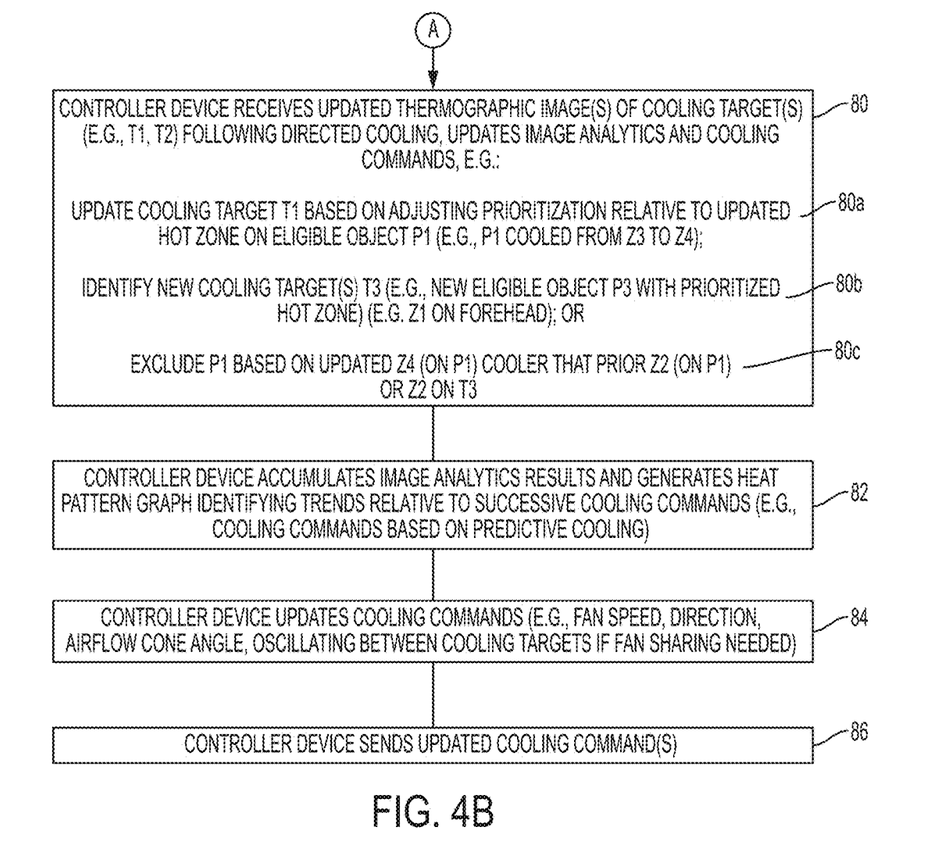

FIGS. 4A and 4B illustrate an example method for identifying cooling targets based on executing image analytics on a thermographic image of an area to be cooled by one or more cooling fans, including prioritizing hot zones for directed cooling, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the device interface circuit 40 is configured for receiving in operation 50 a thermographic image 18 of the area 26 to be cooled by one or more cooling fans 14. The thermographic image 18 can be received by the device interface circuit 40, for example, via the Power over Ethernet (PoE) connection 30 and/or the data link 45b. As described previously, the device interface circuit 40 can include a Power over Ethernet connector 40a configured for receiving power and/or data from the Power over Ethernet connection 30.

The processor circuit 42 is configured for identifying (e.g., in one or more operations 52 through 60) at least a first cooling target (e.g., "T1" 24a) within the cooling area 26 based on the processor circuit 42 executing image analytics on the thermographic image 18 using the image analytics resource 46. The first cooling target (e.g., 24a) can be identified based on the image analytics resource 46 executed by the processor circuit 42 prioritizing hot zones 28 on one or more identified objects (e.g., 22a) in the thermographic image 18, and the image analytics resource 46 identifying among the prioritized hot zones 28 the first cooling target (e.g., "T1" 24a) as covering a first hot zone (e.g., "Z3" 20c, "Z4" 20d) on a first identified object "P1" 22a.

For example, the image analytics resource 46 can identify in operation 54 the identified objects 22 that are eligible for cooling (i.e., "eligible objects"), for example the identified individuals "P1" 22a and "P2" 22c; the image analytics resource 46 also can exclude in operation 54 any ineligible objects (e.g., "P4" 22b) that are identified as not requiring cooling, for example household pets, inanimate objects such as a pot of boiling water, an incandescent lightbulb, a heating vent, etc.

Figure 5:
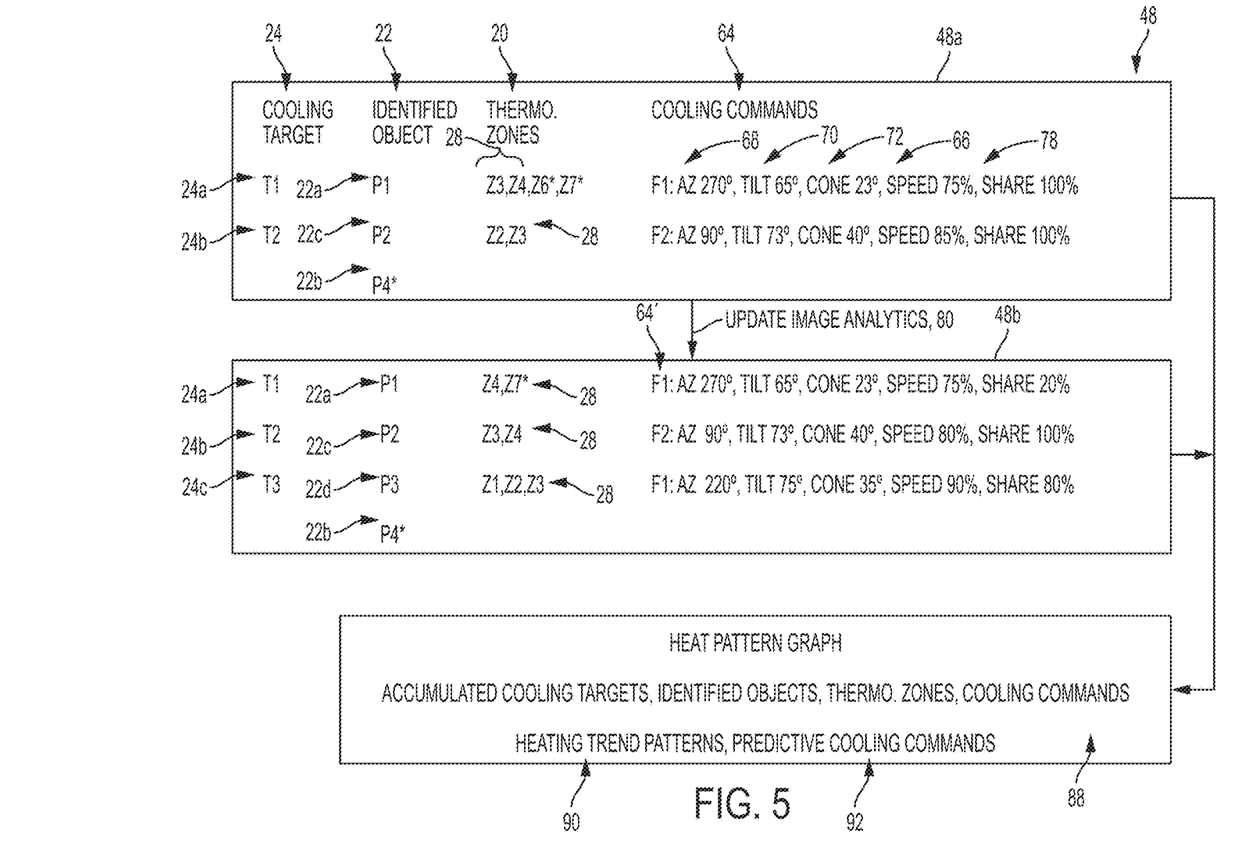
FIG. 5 illustrates an example data structure storing image analytics results, according to an example embodiment.

FIG. 5 illustrates an example data structure 48 storing image analytics results 48a, 48b, and a heat pattern graph 88, according to an example embodiment. As illustrated in FIG. 5, the identified object "P4" 22b is indicated as excluded from consideration as a cooling target, or prioritization of any if its thermographic zones 20, based on the asterisk "*". The image analytics resource 46 also can exclude in operation 54 any eligible objects (e.g., an individual) that has only cool thermographic zones and thus does not require cooling, for example at zones "Z5" 20e or higher (e.g., "Z6" 20f, "Z7" 20g, "Z8" 20h, etc.).

The image analytics resource 46 also can be configured to exclude in operation 54, from any prioritizing of hot zones 28, any identified object that is not determined to require cooling, for example an unregistered user that is not recognized by the image analytics resource 46; for example, the controller device 12 can be configured for identifying only users having registered with the system (using, for example, a smart phone), and excluding any person in the thermographic image 18 that is not determined to require cooling because the person has not registered with the system. Hence, unregistered individuals can be excluded from the determination of whether they require cooling.

The image analytics resource 46 executed by the processor circuit 42 in operation 56 can prioritize hot zones 28 for the eligible objects 22 that have not been excluded in operation 54. For example, the image analytics resource 46 can prioritize hot zones 28 on an identified object 22 in the thermographic image 18. Each thermographic zone 20 can be identified by temperature (or temperature range), in combination with area-specific attributes that defines the area of the corresponding thermographic zone 20 within the thermographic image 18 (e.g., shape, size, positional X-Y coordinates within the thermographic image 18, etc.). The image analytics resource 46 also can generate a first prioritized list of hot zones 28 in the thermographic image 18 sorted by thermographic zone (e.g., starting with all zones "Z1", then all zones "Z2", etc.); the image analytics resource 46 also can correlate the first prioritized list relative to the eligible objects, resulting in the prioritized list of thermographic hot zones 28 relative to an eligible object (e.g., 22a), resulting in the prioritized list "Z3, Z4" for the identified object 22a (the thermographic zones "Z6" 20f and "Z7" 20g are identified in operation 56 as cold zones by the asterisk "*" (e.g., "Z6*", "Z7*") and are therefore excluded from the prioritized hot zones for the eligible object "P1" 22a).

In response to establishing in operation 56 the prioritized list of hot zones (e.g., "Z3", "Z4") 28 for an identified eligible object (e.g., "P1" 22a), the image analytics resource 46 executed by the processor circuit 42 in operation 58 can identify a cooling target (e.g. "T1" 24a) based on the prioritized hot zones 28 and the identified cold zones "Z6*" and "Z7*". If desired, the selection of a cooling target 24 can be prioritized, for example based on identifying an eligible object 22 having the highest single prioritized hot zone (e.g., the eligible object 22 having the highest hot zone "Z1" 20a), or based on identifying an eligible object 22 having the highest aggregate prioritized hot zones (e.g. a first person having overall the highest aggregate zones "Z2, Z3, Z4" has higher priority than a second person having the aggregate zones "Z1, Z4, Z5" where the zone "Z1" on the second person is substantially smaller than the zone "Z2" on the first person).

The position of the cooling target 24 can be determined based on identifying the positional attributes from the thermographic image 18 of the prioritized hot zones (e.g., "Z3", "Z4") on the eligible object (e.g., "P1" 22a) relative to any excluded cold zones (e.g., "Z6*" and "Z7*"). These raw positions in the thermographic image 18 are processed based on a model of the location and optical characteristics of the thermographic image sensor array 16, and a geometric model of the relative locations of the cooling fans 14. The airflow cone angle to be generated (74 in FIG. 1) can be determined based on the image analytics resource 46 analyzing the density and size of the prioritized hot zones relative to other thermographic zones on the identified object; as illustrated in FIGS. 1 and 5, the person "P1" 22a has a higher density of prioritized hot zones "Z3" and "Z4" (i.e., higher temperatures within a smaller area) relative to the excluded cold zones "Z6*" and "Z7*", requiring a narrower cone angle (e.g., twenty-three degrees) 74a to avoid the cold zones "Z6" and "Z7" on the person "P1" 22a; in contrast, the lower density of prioritized hot zones on the person "P2" 22c having the prioritized hot zones "Z2" and "Z3" throughout his entire body can cause the image analytics resource 46 to set the corresponding generated airflow angle 74b to a wider angle (e.g., forty degrees) to cover the entire body.

Hence, the image analytics resource 46 in operation 60 can determine image analytics results 48 that include necessary parameters for generating in operation 76 a cooling command 64 for a cooling target 24, the image analytics results 48 including for each cooling target 24 a fan speed 66, fan direction (including azimuth angle 68 and tilt angle 70, airflow cone angle 72 for generating the airflow angle 74, and a share percentage 78 for use in case the cooling fan 14 needs to oscillate between two cooling targets 24). Generation of the cooling command 64 based on the image analytics results 48 also minimizes the power required by the cooling devices 14 to provide the necessary cooling in the low-power cooling system 10, as the generation of the cooling command 64 based on the image analytics results 48 can provide the necessary cooling using the minimum number of small, low-power directional cooling device 14, and at the minimum speed on each active cooling device 14 required to achieve the desired cooling effects for all eligible objects 22. Hence, the low-power cooling system avoids the wasting of energy normally encountered when operating larger, more dispersed fans that do not exclusively cool target objects due to a lack of precise control of the larger fans.

The image analytics described above can be repeated in operation 62 by the image analytics resource 46 for each detected eligible object 22. The image analytics can also be repeated periodically in order to detect the arrival or departure of eligible objects, and track any eligible object as it moves around the cooling area 26.

Hence, the image analytics resource 46 executed by the processor circuit 42 in operation 78 can generate one or more cooling commands (64 of FIG. 5) for one or more cooling fans 14 based on the image analytics results 48a of FIG. 5. As illustrated in FIG. 5, a cooling command 64 can include any one of a speed command (e.g., expressed as revolutions per minute (RPM) or percentage of maximum speed for each fan) 66, a direction command such as an azimuth command 68 and a tilt command 70 for slewing of the corresponding cooling fan 14 toward the cooling target 24, an airflow cone angle command 72 that causes the cooling fan 14 to adjust a generated airflow angle (e.g., 74a, 74b of FIG. 1). Hence, the device interface circuit 40 in operation 76 can output the cooling commands "F1" and "F2", via the Power over Ethernet connection 30, to the cooling fans 14a and 14c for directed cooling of the cooling targets "T1" 24a and "T2" 24b, respectively.

Referring to FIG. 4B, the image analytics resource 46 of the controller device 12 in operation 80 can receive, via the device interface circuit 40, an updated thermographic image 18' from the thermographic image sensor array 16 via the Power over Ethernet connection 30. The updated thermographic image 18' can detect the effects of the cooling fans 14a, 14c cooling the respective cooling targets "T1" 24a and "T2" 24b in response to the cooling commands "F1" and "F2" generated in the image analytics results 48a. Hence, the image analytics resource 46 in operation 80 can generate updated image analytics results 48b in response to the updated thermographic image 18'.

For example, the image analytics resource 46 can update in operation 80a the cooling target "T1" 24a based on adjusting the prioritization relative to the updated hot zone "Z4" and the excluded cold zone "Z7*", and update the cooling target "T2" 24b in response to detecting the updated hot zones "Z3" and "Z4"; the image analytics resource 46 also can identify in operation 80b a new cooling target (e.g., "T3") 24c as a new eligible object "P3" 22d with prioritized hot zones "Z1", "Z2", and "Z3" (e.g., the zone "Z1" on the new person's forehead). If applicable, the image analytics resource 46 also can exclude in operation 80c an identified object (e.g., "P1" 22a) from a cooling target 24 based on an updated thermographic zone "Z4" being identified as cooler than the original thermographic zone "Z3" for the identified object (e.g., "P1" 22a) and cooler than an identified hot zone (e.g., "Z1") for the new cooling target (e.g., "T3" 24c); hence, the image analytics resource 46 can determine that an original cooling target (e.g., 24a) has been sufficiently cooled that the priority should be granted to the new cooling target "T3" 24c illustrated in FIG. 5. The image analytics resource 46 also can determine if any target object moves out of cooling area 26 (e.g., moves out of the effective cooling range of the cooling devices 14 or the effective sensing range of thermographic image sensor array 16), and remove that target from the list of objects to be cooled.

Alternately, the image analytics resource 46 can determine in operation 80 that cooling command instructions for a given fan "F1" can include share percentage instructions (78 of FIG. 5) that enable the cooling fan 14a to oscillate between two cooling targets 24a and 24c, for example twenty percent time is spent by the cooling fan 14a cooling the cooling target 24a, and eighty percent time is spent by the cooling fan 14a cooling the cooling target 24c. The oscillation by the cooling device 14 enables the low-power cooling system 10 to cool a greater number of eligible objects 22 that exceeds the number of available cooling devices 14a-c.

As illustrated in FIG. 5, in one embodiment the image analytics resource 46 in operation 82 can generate a heat pattern graph 88 for the cooling area 26 over time based on accumulating the image analytics results 48a and 48b over time. The heat pattern graph 88 can enable the image analytics resource 46 to identify heating trend patterns 90 in the cooling area 26 relative to successive cooling commands 64 generated and output by the controller device 12. Hence, the image analytics resource 46 can combine the feedback-based image analytics from the thermographic images 18 with the heating trend patterns 90 to optimize predictive cooling commands 92. The predictive cooling commands 92 enable the low-power cooling system 10 to reduce the cooling earlier if the temperature trend of the temperature of eligible objects 22 is rapidly decreasing, or increase cooling preemptively if the temperature trend of the temperature of eligible objects is increasing.

The image analytics resource 46 can generate updated cooling commands 64' for the cooling fans 14 based on the updated image analytics results 48b in operation 84, and the device interface circuit 40 can output the updated cooling commands 64' to the cooling fans 14 via the Power over Ethernet connection 30 in operation 86.

According to example embodiments, execution of image analytics on thermographic images enables precise identification of cooling targets based on prioritizing hot zones on objects identified as requiring cooling. The precise identification of cooling targets enables use of low-power fans that can provide directed cooling of one or more cooling targets using Power over Ethernet.

Although the controller device 12 is illustrated in FIG. 1 as proximate to the thermographic image sensor array 16 and the cooling fans 14 (e.g., as an integrated cooling fan assembly), the controller device 12 can be deployed in a remote location (e.g., a service room of an apartment building, or a cloud-based data center that is reachable via a wide area network such as the Internet) for servicing multiple cooling areas 26 having respective sets of cooling fans 14 and monitored by respective thermographic image sensor arrays 16, where the thermographic images 18 and cooling commands 64 can be exchanged via the Power over Ethernet connection 30.

While the example embodiment uses thermographic imaging to control cooling devices implemented as cooling fans, the cooling fans can be replaced by directional heating devices such as infrared emitters, and the heating needs of cold objects in the area can as easily be managed.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   a controller receiving a thermographic image of an area to be cooled by one or more cooling devices;
   the controller identifying at least a first cooling target within the area to be cooled based on executing image analytics on the thermographic image, comprising identifying a plurality of identified objects based on executing pattern recognition on the thermographic image, identifying one or more ineligible objects from the identified objects that are ineligible for cooling regardless of a corresponding temperature of the one or more ineligible objects, identifying one or more eligible objects eligible for cooling, identifying the first cooling target based on prioritizing hot zones on one or more of the identified eligible objects in the thermographic image relative to a plurality of thermographic zones having respective temperature ranges, and identifying among the prioritized hot zones the first cooling target as covering a first hot zone on a first identified eligible object; and
   the controller generating and sending a cooling command to the one or more cooling devices for directed cooling of at least the first cooling target.

2. The method of claim 1, further comprising:
   receiving an updated thermographic image containing the first cooling target;
   identifying one or more updated cooling targets based on updating execution of the image analytics on the updated thermographic image; and
   the controller sending an updated cooling command to the one or more cooling devices based on the updated thermographic image, for changing from directed cooling of at least the first cooling target to directed cooling of the one or more updated cooling targets.

3. The method of claim 2, wherein the identifying one or more updated cooling targets includes at least one of:
   adjusting a prioritization of the first identified eligible object based on a corresponding updated first hot zone for the first identified eligible object obtained from the updated thermographic image; identifying a new cooling target based on identification of a second identified eligible object having a corresponding second hot zone; or
   excluding the first identified eligible object from the one or more updated cooling targets based on identifying the updated first hot zone as cooler than the first hot zone and the second hot zone.

4. The method of claim 2, further comprising generating a heat pattern graph for the area based on accumulating image analytics results on a plurality of the thermographic images over time, the heat pattern graph identifying heating trend patterns in the area relative to successive cooling commands generated and output by the controller.

5. The method of claim 1, wherein:
   the identifying includes identifying a second cooling target within the area to be cooled based on executing the image analytics, the second cooling target identified as a second hot zone on a second identified eligible object distinct from the first identified object;
   the generating includes specifying in the cooling command instructions for causing a first of cooling devices to oscillate between the first cooling target and the second cooling target.

6. The method of claim 1, wherein the generating includes setting an airflow cone angle based on an identified density and size of the first hot zone, the airflow cone angle causing the one or more cooling devices to adjust a generated airflow cone angle directed toward the first cooling target.

7. The method of claim 1, further comprising:
   the controller receiving power from a Power over Ethernet connection;
   the controller receiving the thermographic image from a sensor via the Power over Ethernet connection; and
   the controller supplying the cooling command to the one or more cooling devices via the Power over Ethernet connection.

8. The method of claim 1, wherein:
   the identifying includes identifying a first cold zone on the first identified eligible object;
   the generating including specifying, in the cooling command, instructions for directed cooling of the first hot zone on the first identified eligible object and that avoids any cooling of the first cold zone on the first identified eligible object.

9. The method of claim 1, wherein the identifying includes excluding, from the prioritizing of hot zones, any identified object that is determined to not require cooling.

10. An apparatus comprising:
    a device interface circuit configured for receiving a thermographic image of an area to be cooled by one or more cooling devices; and
    a processor circuit configured for identifying at least a first cooling target within the area to be cooled based on the processor circuit executing image analytics on the thermographic image, the processor circuit configured for identifying a plurality of identified objects based on executing pattern recognition on the thermographic image, the processor circuit further configured for identifying one or more ineligible objects from the identified objects that are ineligible for cooling regardless of a corresponding temperature of the one or more ineligible objects, identifying one or more eligible objects eligible for cooling, identifying the first cooling target based on prioritizing hot zones on one or more of the identified eligible objects in the thermographic image relative to a plurality of thermographic zones having respective temperature ranges, and identifying among the prioritized hot zones the first cooling target as covering a first hot zone on a first identified eligible object;
    the processor circuit further configured for generating a cooling command that is output by the device interface circuit, the cooling command including instructions for the one or more cooling devices to implement directed cooling of at least the first cooling target.

11. The apparatus of claim 10, wherein:
    the device interface circuit is configured for receiving an updated thermographic image containing the first cooling target;
    the processor circuit configured for identifying one or more updated cooling targets based on updating execution of the image analytics on the updated thermographic image; and
    the processor circuit configured for generating an updated cooling command for the one or more cooling devices based on the updated thermographic image, the updated cooling command including instructions for changing from directed cooling of at least the first cooling target to directed cooling of the one or more updated cooling targets.

12. The apparatus of claim 11, wherein the processor circuit is configured for identifying one or more updated cooling targets based on at least one of:

adjusting a prioritization of the first identified eligible object based on a corresponding updated first hot zone for the first identified eligible object obtained from the updated thermographic image; identifying a new cooling target based on identification of a second identified eligible object having a corresponding second hot zone; or excluding the first identified eligible object from the one or more updated cooling targets based on identifying the updated first hot zone as cooler than the first hot zone and the second hot zone.

13. The apparatus of claim 11, wherein the processor circuit configured for generating a heat pattern graph for the area based on accumulating image analytics results on a plurality of the thermographic images over time, the heat pattern graph identifying heating trend patterns in the area relative to successive cooling commands generated and output by the controller.

14. The apparatus of claim 10, wherein:

the processor circuit is configured for identifying a second cooling target within the area to be cooled based on executing the image analytics, the second cooling target identified by the processor circuit as a second hot zone on a second identified eligible object distinct from the first identified object;

the processor circuit is configured for specifying in the cooling command instructions for causing a first of cooling devices to oscillate between the first cooling target and the second cooling target.

15. The apparatus of claim 10, wherein the processor circuit is configured for setting in the cooling command an airflow cone angle based on an identified density and size of the first hot zone, the airflow cone angle causing the one or more cooling devices to adjust a generated airflow cone angle directed toward the first cooling target.

16. The apparatus of claim 10, wherein:

the device interface circuit includes a Power over Ethernet connector configured for receiving power and data from a Power over Ethernet connection;

device interface circuit is configured for receiving the thermographic image from a sensor via the Power over Ethernet connector;

the device interface circuit configured for supplying the cooling command to the one or more cooling devices via the Power over Ethernet connector.

17. The apparatus of claim 10, wherein:

the processor circuit is configured for identifying a first cold zone on the first identified eligible object;

processor circuit is configured for specifying, in the cooling command, instructions for directed cooling of the first hot zone on the first identified eligible object and that avoids any cooling of the first cold zone on the first identified eligible object.

18. The apparatus of claim 10, wherein processor circuit is configured for excluding, from the prioritizing of hot zones, any identified object that is determined to not require cooling.

19. One or more non-transitory tangible media encoded with logic for execution by a machine and when executed by the machine operable for:

receiving, by the machine implemented as a controller, a thermographic image of an area to be cooled by one or more cooling devices;

identifying at least a first cooling target within the area to be cooled based on executing image analytics on the thermographic image, comprising identifying a plurality of identified objects based on executing pattern recognition on the thermographic image, identifying one or more ineligible objects from the identified objects that are ineligible for cooling regardless of a corresponding temperature of the one or more ineligible objects, identifying one or more eligible objects eligible for cooling, identifying the first cooling target based on prioritizing hot zones on one or more of the identified eligible objects in the thermographic image relative to a plurality of thermographic zones having respective temperature ranges, and identifying among the prioritized hot zones the first cooling target as covering a first hot zone on a first identified eligible object; and generating and sending a cooling command to the one or more cooling devices for directed cooling of at least the first cooling target.

20. The one or more non-transitory tangible media of claim 19, wherein the identifying includes excluding, from the prioritizing of hot zones, any identified object that is determined to not require cooling.

* * * * *

UNITED STATES PATENT AND TRADEMARK OFFICE
CERTIFICATE OF CORRECTION

PATENT NO. : 10,323,854 B2
APPLICATION NO. : 15/493945
DATED : June 18, 2019
INVENTOR(S) : Byers Page 1 of 1

It is certified that error appears in the above-identified patent and that said Letters Patent is hereby corrected as shown below:

In the Specification

Column 4, Line 9, delete "8016018".

Signed and Sealed this
Sixth Day of August, 2019

Andrei Iancu
*Director of the United States Patent and Trademark Office*